United States Patent [19]

Tokutomi et al.

[11] Patent Number: 5,757,492
[45] Date of Patent: May 26, 1998

[54] APPARATUS FOR MEASURING THE FLYING HEIGHT OF MAGNETIC HEADS USING A SINGLE-CRYSTAL SAPPHIRE DISC

[75] Inventors: Teruaki Tokutomi, Odawara; Kyoichi Mori; Toshinori Sugiyama, both of Kanagawa-ken, all of Japan

[73] Assignee: Hitachi Electronics Engineering Co., Ltd., Tokyo, Japan

[21] Appl. No.: 636,804

[22] Filed: Apr. 23, 1996

[30] Foreign Application Priority Data

Apr. 25, 1995 [JP] Japan ................... 7-124364

[51] Int. Cl.$^6$ ................................................. G01B 9/02
[52] U.S. Cl. .................................................. 356/357
[58] Field of Search ........................... 356/357, 351, 356/355

[56] References Cited

FOREIGN PATENT DOCUMENTS 5-322522  12/1993  Japan .

*Primary Examiner*—Samuel A. Turner
*Attorney, Agent, or Firm*—Fay, Sharpe, Beall, Fagan, Minnich & McKee

[57] ABSTRACT

The improved for measuring the flying height of a magnetic head comprises a clear disk made of single-crystal sapphire, a spindle on which said disk is mounted for rotation, a mechanism for loading the magnetic head above one surface of said disk, measuring optics having a photoelectric converter that receives the light produced by interference of reflected light from said one surface of said disk with reflected light from the surface of said magnetic head as a result of application of light to said one surface through the other surface of said disk, and which converts the received interference light to an electric signal by means of said photoelectric converter, and a processing unit for calculating the flying height of said magnetic head in response to said electric signal from said measuring optics.

7 Claims, 4 Drawing Sheets

APPARATUS FOR MEASURING THE FLYING HEIGHT OF MAGNETIC HEADS USING A SINGLE-CRYSTAL SAPPHIRE DISC

BACKGROUND OF THE INVENTION

This invention relates to an apparatus for measuring the flying height of magnetic heads. More particularly, the invention relates to an apparatus with which very small flying heights of thin-film magnetic heads can be measured precisely in close association with the operating conditions of an actual magnetic disk storage apparatus (hereunder referred to simply as a "magnetic disk apparatus").

FIG. 5 illustrates the relative positions of a magnetic disk and a flying-type head that is lifted above the disk for information recording and reproduction (the flying-type head is hereunder referred to simply as a "head"). As shown in FIG. 5(a), the magnetic disk 1 is mounted on a spindle 2 for rotation. The head 31 for reading data from the disk 1 or writing data into the disk 1 is provided at the front end of a support arm 32 and its rear end is secured to a support member 41 provided on a carriage mechanism 4. The head 31 is moved by the carriage mechanism 4 for loading on the magnetic disk 1.

FIG. 5(b) shows the external appearance of the head 31. Slider surfaces 311 are formed on the underside of the head 31 and an air flow created by the rotation of the magnetic disk 1 causes the slider surfaces 311 to be lifted above the surface of the disk 1 by a height h as shown in FIG. 5(c) for accessing data from a predetermined track.

The flying height h is so important for the head operation that all the heads manufactured are subjected to pre-shipment inspection with flying height measuring apparatus. FIG. 6 shows schematically the configuration of an apparatus for measuring the flying height of head by using interference waves of white light. As shown in FIG. 6(a), a clear quartz glass disk 5 for testing purposes (which is hereunder referred to simply as a "disk") is mounted on a spindle 2 for rotation and a head 31 is loaded above the back surface 52 of the disk 5 by means of a head loading mechanism 3 which corresponds to the carriage mechanism 4. Measuring optics 6 is provided over the disk 5 and white light $L_T$ of a certain wavelength band ($\lambda a$–$\lambda b$) issuing from a xenon lamp (source) 1 is passed through a projection lens 62 and reflected by a half mirror 63 such that it is admitted through an objective lens 64 to be projected onto the disk 5. Part of the white light $L_T$ is reflected by the obverse surface 51 and the reverse surface 52 of the disk 5 but most of the light is transmitted through the disk 5 to illuminate the slider surfaces 311. The head loading mechanism 3 is controlled by a data processing unit 7.

Referring now to FIG. 6(b), let us assume that the obverse surface 51, reverse surface 52 and slider surface 311 have reflectances q, r and s, respectively, and let us write Rq, Rr and Rs for the components of reflected light from those portions. The reflected light Rr interferes with Rs to produce an interference wave Rrs, which is passed through the half mirror 63 to be launched into a concave diffraction grating 65 which works as a spectrometer to disperse Rrs into spectral components. It should be noted here that the interference of the reflected light Rq by Rr and Rs is negligibly small on account of the use of white light and because the thickness, d, of the disk 5 is by far greater than the amount of flying height h.

The interference wave Rrs is picked up by a linear sensor 66, which produces a wavelength-dependent spectrum pattern signal as shown in FIG. 6(c). This pattern signal is processed by the data processing unit 7 to determine the amount of flying height h.

Stated more specifically, the graph shown in FIG. 6(c) plots the wavelength on the horizontal axis and interference wave's intensity Irs on the vertical axis. The graph shows three peaks $P_1$, $P_2$ and $P_3$ at respective wavelengths, $\lambda_1$, $\lambda_2$ and $\lambda_3$. If reflected light Rr and Rs are assumed to have a phase angle $\delta$, it can be related to the flying height h and the wavelength $\lambda$ by the following equation:

$$\delta = 4\pi h/\lambda (\lambda = \lambda a - \lambda b) \tag{1}$$

This equation (1) can be used to calculate the flying height from the peak wavelengths $\lambda_1$, $\lambda_2$ and $\lambda_3$.

The reflectance of interference light in a small gap with respect to incident light can generally be expressed by the following equation:

$$R(\lambda, h) = \frac{r(\lambda) + s(\lambda) - 2(r(\lambda)s(\lambda))^{1/2}\cos\delta}{1 + r(\lambda)s(\lambda) - 2(r(\lambda)s(\lambda))^{1/2}\cos\delta} \tag{2}$$

where $\delta = 4\pi h/\lambda$; $\lambda$, wavelength; h, the flying height of head; $R(\lambda, h)$, the reflectance at wavelength $\lambda$ for the flying height h; $r(\lambda)$, the reflectance at wavelength $\lambda$ from a glass disk as seen from an air layer; $s(\lambda)$, the reflectance at wavelength $\lambda$ from the head as seen from the air layer. This equation (2) can be used to determine a theoretical amount of flying height from the spectral distribution and reflectance of the interference light at a given wavelength.

The method of measuring the flying height of a magnetic head by eq. (1) which relates the phase angle $\delta$ to the flying height (h) and the wavelength ($\lambda$) works effectively if h is reasonably great; however, if h is 0.1 micron or less, significant peaks sometimes fail to appear, making it impossible to achieve precise measurements of the flying height.

As an alternative method, the theoretical value obtained by eq. (2) may be used as a reference for comparison to calculate the amount of flying height. In practice, however, this method is highly prone to cause errors between a specific measured value and the flying of a magnetic head as it is used on an actual magnetic disk apparatus. A probable reason for this problem is that the values of reflectances r and s differ from data for the actual head.

Another problem with the use of eq. (2) is that the time of measurement is unavoidably extended if data are taken at a sufficient number of points that correct decision can be made. What is more, the storage capacity of recent models of magnetic disk apparatus has increased to make it necessary for reducing the head-to-disk gap and this, in turn, has made it a common practice to measure the flying heights of all the heads to be shipped with a view to insuring utmost reliability for the magnetic disk apparatus of interest. This raises the need for an inspection apparatus that is capable of shorter and yet reliable measurements of the flying height of heads. However, this requirement cannot be met by the aforementioned prior art method.

The assignee has already filed Unexamined Published Japanese Application (kokai) No. 322522/1993, in which they proposed a method for measuring the flying height of heads on the basis of more correctly determined values of reflectances r and s.

SUMMARY OF THE INVENTION

The present invention has been accomplished under these circumstances and has as an object providing an apparatus capable of highly precise measurements of the flying height of a head even if its amount is small and with the occurrence of reduced deviations from the actual amount of flying height in magnetic disk apparatus.

This object of the invention can be attained by an apparatus comprising a clear disk made of single-crystal sapphire, a spindle on which said disk is mounted for rotation, a mechanism for loading a head above one surface of said disk, measuring optics having a photoelectric converter that receives the light produced by interference of reflected light from said one surface of said disk with reflected light from the surface of said head as a result of application of light to said one surface through the other surface of said disk, and which converts the received interference light to an electric signal by means of said photoelectric converter, and a processing unit for calculating the lift of said head in response to said electric signal from said measuring optics.

The heart of the present invention is to use a single-crystal sapphire disk in measuring the flying height of a head. The disk can be made lighter and thinner than the conventional quartz disk; this feature of the disk combines with its relatively high refractive index (ca. 1.76) to permit more of the incident light to be reflected toward the measuring optics. As a result, the intensity of interference light can be increased relative to noise and the lighter disk can be rotated at a faster speed. The conventional quartz disk has a refractive index of 1.46.

Single-crystal sapphire is very hard and requires the following procedure to be shaped into a disk: a tabular crystal is first grown, then shaped into a disk and polished on both sides with diamond abrasive grit particles.

The single-crystal sapphire from which a disk for use in measuring the flying height of a magnetic head is chiefly made of aluminum oxide ($Al_2O_3$) having a Mohs hardness of 9. Ceramics that form the slider surfaces of the (thin-film) magnetic head are also chiefly made of aluminum oxide having a Mohs hardness of 9. Because of this sameness in hardness, the single-crystal sapphire disk has the advantage of resisting frequent contacts by the head without developing scratch flaws.

On the other hand, the conventional quarts glass disk has a Mohs hardness of about 7 and if it is subjected to frequent contacts by the harder slider surfaces of the head, the disk surface will develop scratch laws. The damaged disk surface not only introduces instability in the flying height of the head but also causes random reflections which are deleterious to the measurement of its flying height, thereby leading to incorrect results. According to the invention, the above-defined single-crystal sapphire is used to provide measured values that are reasonably close to the theoretical values calculated by eq. (2).

To meet the demand for higher storage capacity, recent models of magnetic disk apparatus have the magnetic head fly above the disk by small distances less than 100 nm and this inevitably increases the frequency of head-disk contact during the measurement of the flying height of the head. As a result, the disk is easily damaged and need be replaced at short intervals, which is not only uneconomical but also unsatisfactory in terms of the efficiency of measurement. This problem can be solved by using the single-crystal sapphire disk since it need be replaced less frequently. The single-crystal sapphire has sufficient scratch resistance that it enables the measurement of flying head height with reduced errors and with higher precision but also has a longer life to reduce the number of disk replacements.

Since the values of detection with the single-sapphire disk are reasonably close to the theoretical values calculated by eq. (2), the measured intensities of interference light from the measurement head will have smaller deviations from the theoretical data on the flying height as calculated from the reflectance (R) vs wavelength relationship with the flying height (h) being taken as a parameter, said relationship being derived by expanding eq. (2) on a graph. When various flying height characteristics are expanded on a graph, definite differences appear at shorter wavelengths in the relationship between flying height and reflectance. On the other hand, the design of optics becomes difficult and requires the use of expensive components in the short wavelength range. Therefore, in order to assure precise measurements with comparable optics to the prior art, the wavelength for measurement is preferably not shorter than 350 nm in view of the characteristics of the curves shown in FIG. 4. The graph in FIG. 4 has so many variations in characteristics at shorter wavelengths that one can distinguish between two levels of flying height even if they are very small. On the other hand, the measurement of flying height to be performed in the present invention relies on the transmission of both the projected and the reflected light through the disk and the shorter the wavelength, the lower the transmittance of light, resulting in a lower intensity of reflected light (interference light to be detected) on account of the attenuation of the light in the optical path. To cope with this problem, the invention employs the single-crystal sapphire disk which is thinner than the conventional quartz glass disk; in practice, however, the detection level of the interference light decreases at wavelengths shorter than 350 nm, resulting in the loss of reliability in high-precision measurements.

DESCRIPTION OF THE PREFERRED EMBODIMENT

Figure 4:
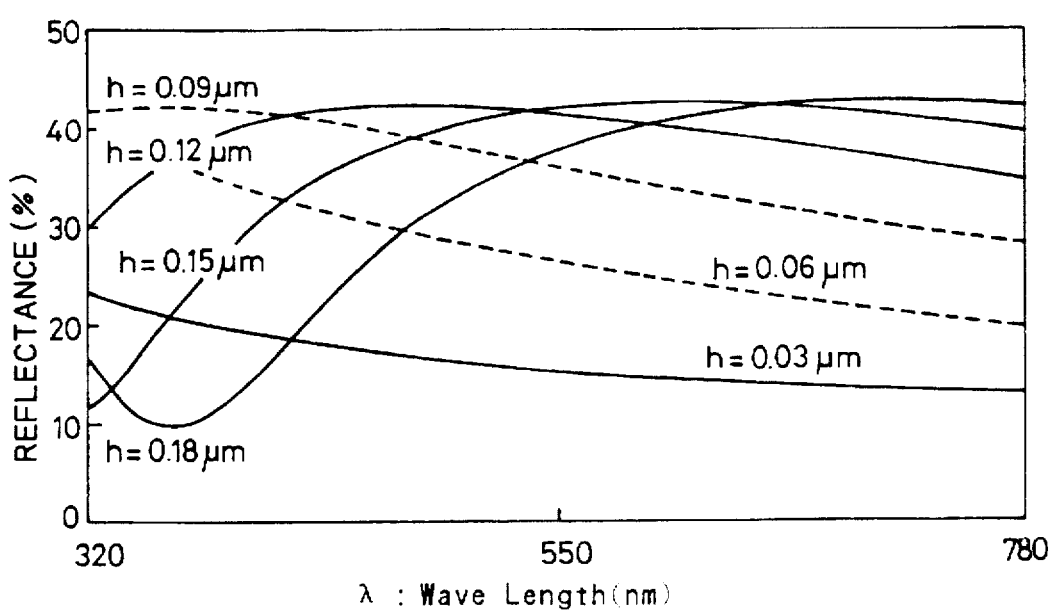
FIG. 4 is a graph showing the relationship between the wavelength of white light and its reflectance from a magnetic head, with the amount of flying head height being taken as a parameter.
Figure 5A:
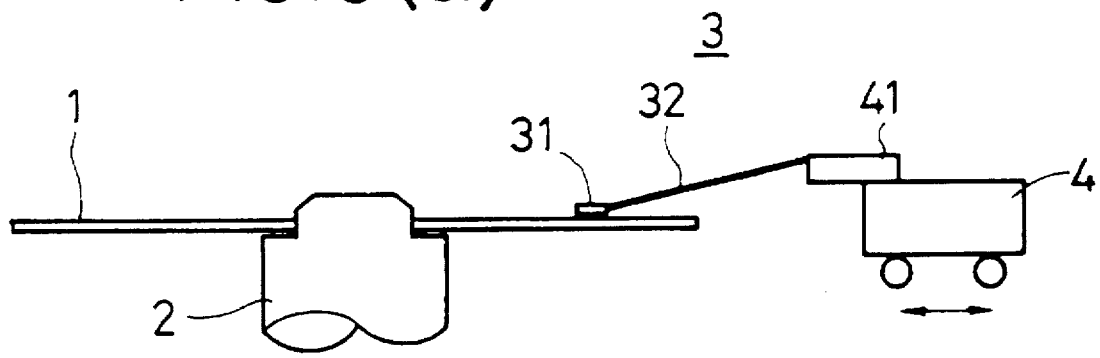
FIG. 5a shows the relative positions of a magnetic disk and a head flying above it.
Figure 5B:
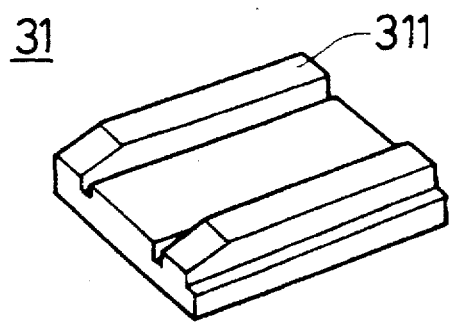
FIG. 5b illustrates the structure of the head body.
Figure 5C:
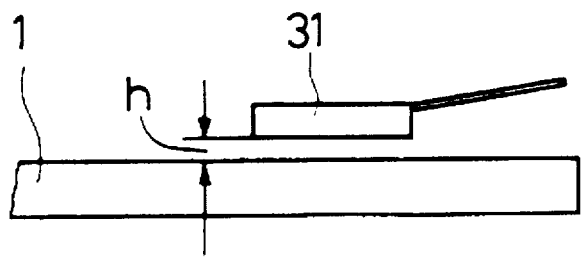
FIG. 5c illustrates how the head flies above the magnetic disk.

FIG. 4 is a graph showing the relationship between the wavelength of white light and its reflectance from a magnetic head, with its flying height (h) as determined by eq. (2) being taken as a parameter. The vertical axis of the graph plots the percent reflectance (R) and the horizontal axis plots the wavelength ($\lambda$).

The characteristic curves in the graph have such a profile that the percent reflectance either increases or decreases monotonically over the range from 350 nm to 780 nm, and up to 800 nm. If the values of measurement taken over this range are subjected to data matching with the theoretical values on the respective curves, one can perform high-speed and yet precise determination of the flying head height (h) to levels as small as 0.1 microns and below. Characteristic curves cross at fewer points in a high wavelength range (>400 nm) than in the lower wavelength range, where one can see a peak on the curve for h=0.18 μm. In addition, as already mentioned, the design of optics for precise measurements becomes increasingly difficult and costly at shorter wavelengths. From a reliability viewpoint, measurements at wavelengths higher than 350 nm are practically recommended. In other words, simple data matching over the measurable wavelength range does not assure that the flying height of the head can be determined in a precise and efficient manner. Beyond 800 nm, the curves for h<0.1 μm become close to one another and the precision of measurements decreases due to the complex index of refraction. In other words, actual light does not simply reflect at the surface of a given substance but behaves as if it penetrated a certain depth into the substance before reflection and this results in an overestimation of the flying height; as a consequence, the detected values will fluctuate significantly if the flying height of the head to be measured is small. A further problem with using wavelengths longer than 800 nm as the criterion for data matching is that the volume of data to be compared increases to lower the processing efficiency.

Figure 1:
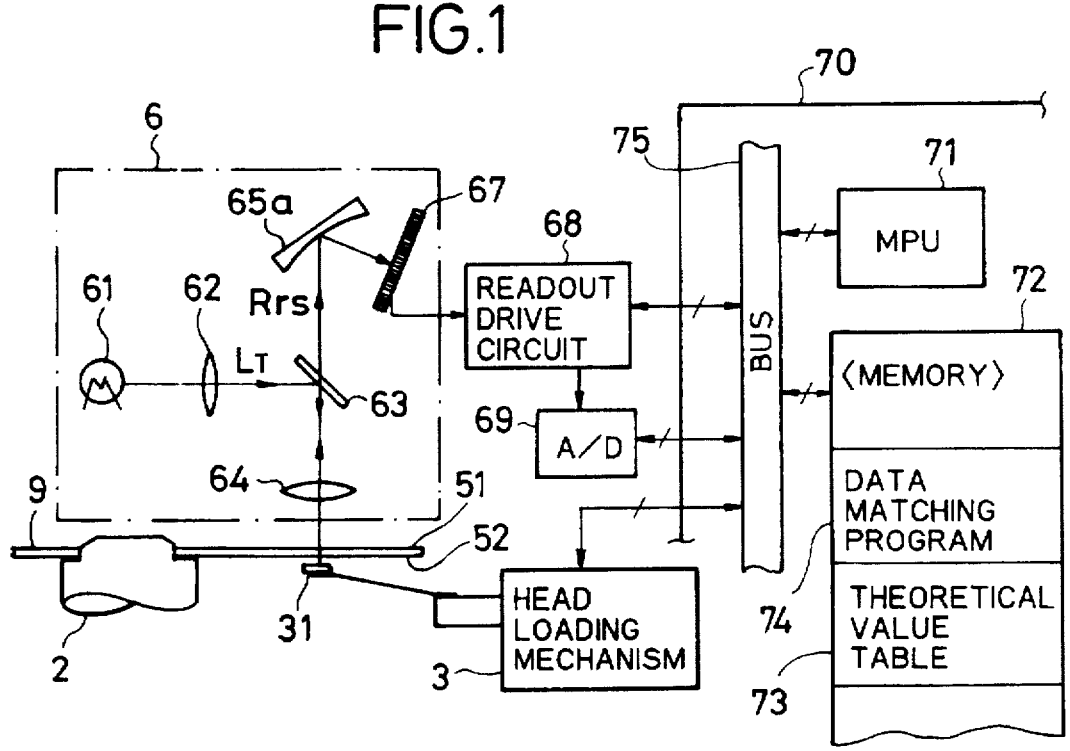
FIG. 1 shows a schematic layout of an apparatus for measuring the flying height of a magnetic head according to an embodiment of the invention.
Figure 6A:
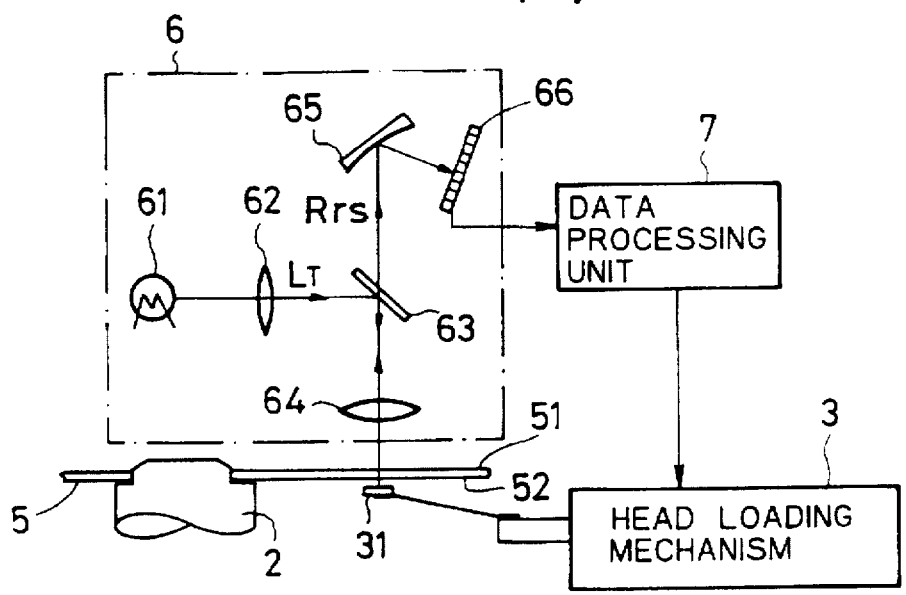
FIG. 6a shows the basic layout of a prior art apparatus for measuring the flying height of a magnetic head.
Figure 6B:
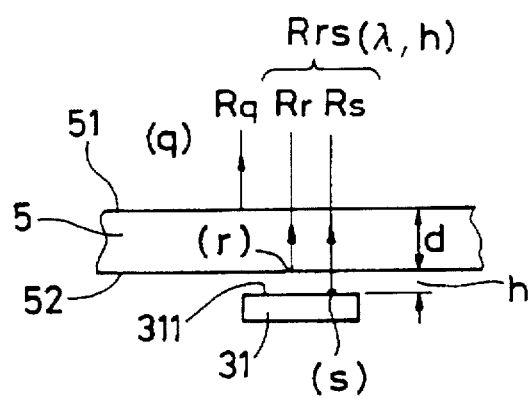
FIG. 6b illustrates the method of measuring the flying height of a head, h.
Figure 6C:
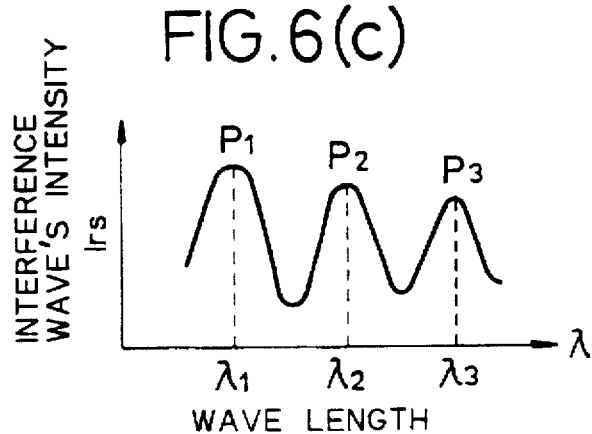
FIG. 6c illustrates a wavelength-dependent spectrum pattern obtained with an interference wave.

Turning now back to FIG. 1, the apparatus of the invention for measuring the flying height of a magnetic head replaces the quartz disk 5 shown in FIG. 6 by a single-crystal sapphire disk 9 which is about three times less thick. As already mentioned, this ensures that the intensity of light to be detected (interference light) can be sensed with such high precision that the detected values are reasonably close to the theoretical values calculated by eq. (2). The lightness of the disk 9 also enables it to be revolved at high speed with reduced vibrations, thereby contributing to measurements at higher precision.

For the reasons already set forth above, the wavelength from 400 nm to 750 nm is selected in order to insure high precision of measurements and satisfactory processing efficiency. Data are taken at about 80–180 sampling points with intervals of about 2–4 nm and compared with the theoretical data in a table 73 (to be described later) that are stored in a memory for representing the corresponding wavelength range in FIG. 4. By this data matching, one can determine the specific amount of flying height h.

For this purpose, the apparatus shown in FIG. 1 replaces the concave diffraction grating 65 in FIG. 6 by a similar grating 65a which also works as a spectrometer to effect dispersion into spectral components over a wavelength range that is reasonably wider than the range of 400–750 nm; in addition, the linear sensor 66 is replaced by a one-dimensional CCD sensor 67 having 256 bits of pixels that are adapted to pick up light over the wavelength range from 400 nm to 750 nm. The output of CCD sensor 67 is read by a readout drive circuit 68 and converted to a digital value by an A/D converter circuit 69 for entry into a data processing unit 70. In FIG. 1, those components which are the same as those shown in FIG. 6 are identified by like numerals. The head loading mechanism 3 is controlled by the data processing unit 70.

In the data processing unit 70, a microprocessor unit (MPU) 71 allows the data from the A/D converter circuit 69 to be stored temporarily in a memory 72 via a bus 75. Then, a total of 128 samples of data are taken at every other pixel over the wavelength range from 400 to 750 nm. The table 73 in the memory 72 stores 128 wavelength-associated samples of data that have been taken at intervals of about 2.7 nm starting from 400 nm. For each wavelength, a detected value is subjected to successive matching with the data for predetermined flying heights of the head. If the detected value matches a certain piece of data, the flying height associated with said piece of data is the value to be marked.

Figure 3:
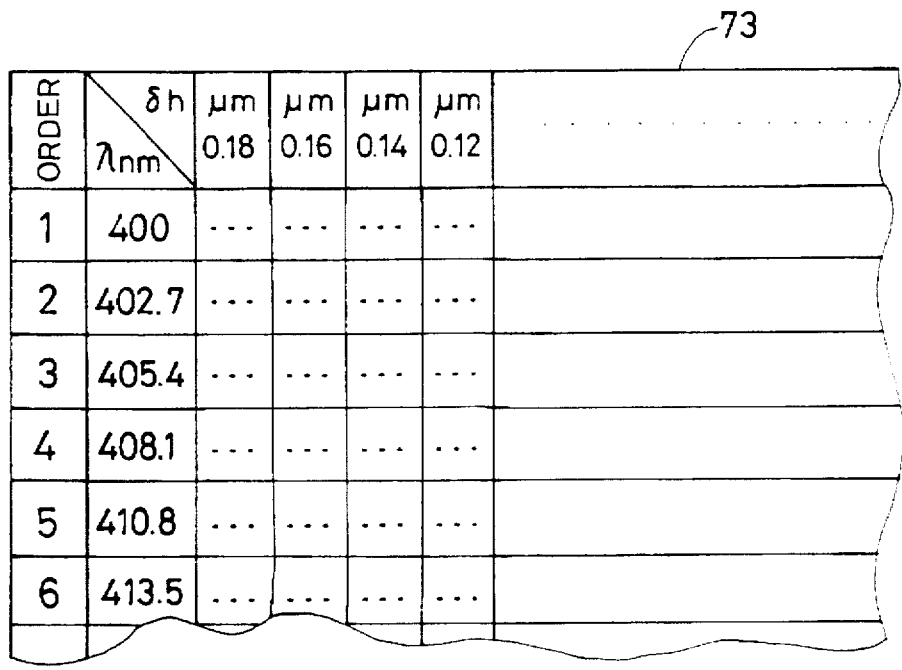
FIG. 3 is a partial illustration of a table containing data on the theoretical values of flying head height.

Table 73 is an array of theoretical values for the flying height of the head that are predetermined for varying wavelengths as shown in FIG. 3.

The basic procedure of data matching consists of the following steps: a value detected at a certain wavelength is looked up among the predetermined data in table 73 for said wavelength to see which piece of the data best approximates the detected value; the flying height associated with the best approximation is marked; these steps are repeated for successive varying wavelengths; and the most frequently marked value of the flying height is adopted as the correct amount of flying height. If the most frequent value accounts for less than about 90% of the sampled data, i.e., less than 115 samples have that value, the result is not reliable and rechecking is necessary.

The applicable processing program is a data matching program 74 stored in memory 72. Details of this program need not be described here since it simply involves performing a substraction on the absolute values of two pieces of data and reading out a value of flying height that corresponds to the smallest difference. The theoretical values in the table 73 may preferably be compensated by as-found or empirical data in consideration of potential variations in measured values. Alternatively, each of the theoretical data may have a specified range, rather than an absolute value, and instead of finding the best approximation, one may check to see if a certain sample of data falls within the specified range and adopt the value of the most frequently matched data as the correct flying height of the head.

Figure 2A:
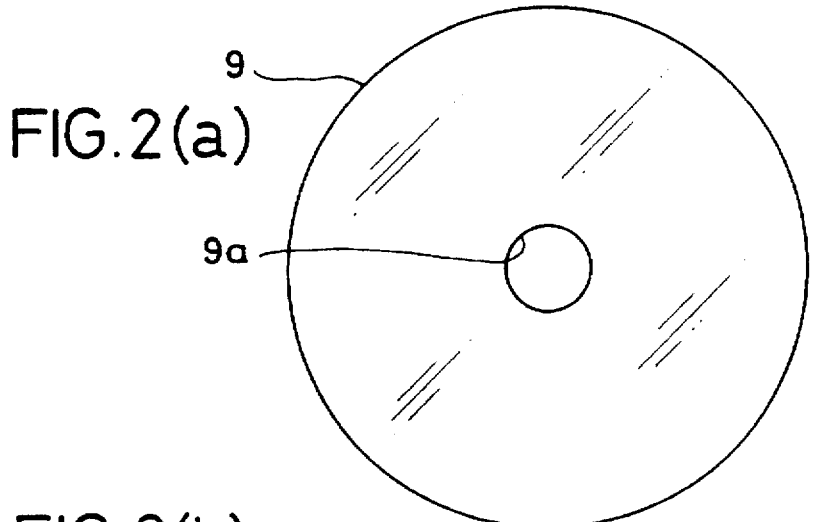
FIG. 2a is a plan view of the single-crystal sapphire disk used in the apparatus.
Figure 2B:
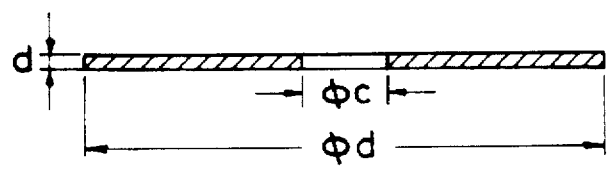
FIG. 2b is a cross section of the disk.

The shape and dimensions of the single-crystal sapphire disk 9 is shown in FIG. 2. It is made of colorless and transparent single-crystal sapphire, from which a tabular crystal is grown and worked to an annular shape. In a typical case, a disk having a diameter (φd) of about 3–120 mm and a thickness (d) of about 1.5–4 mm is prepared, provided with a center hole 9a having a diameter (φc) of about 5–20 mm, and polished on both sides with a diamond abrasive grit for finishing the surfaces to high precision.

For a magnetic disk having a diameter of 3.5 inches, optimal values of φd, φc and d are 105 mm, 5 mm and 2 mm, respectively.

What is claimed is:

1. An apparatus for measuring the flying height of a magnetic head comprising a clear disk made of single-crystal sapphire, a spindle on which said disk is mounted for rotation, a mechanism for loading the magnetic head above one surface of said disk, measuring optics having a photoelectric converter that receives the light produced by interference of reflected light from said one surface of said disk with reflected light from the surface of said magnetic head as a result of application of light to said one surface through the other surface of said disk, and which converts the received interference light to an electric signal by means of said photoelectric converter, and a processing unit for calculating the flying height of said magnetic head in response to said electric signal from said measuring optics.

2. An apparatus according to claim 1, wherein said disk has a thickness ranging from 1.5 mm to 4 mm.

3. An apparatus according to claim 2, wherein said magnetic head is a thin-film head and said measuring optics having projection optics for illuminating said thin-film head with white light including wavelengths of 350 nm to 800 nm through said disk and a spectrometer that receives the reflected light from said thin-film head through said disk and which disperses it into spectral components over a wavelength range including 350–800 nm and wherein said photoelectric converter is a photoelectric transducer comprising a multiple of detecting pixels arranged in a row which receives the spectral light from said spectrometer and by which the intensity of light at each of the wavelengths associated with said detecting pixels is converted to an electric signal.

4. An apparatus according to claim 3, wherein said processing unit receives the signal from said photoelectric converter as a pixel-associated digital signal after A/D conversion and calculates the amount of flying height by looking up said digital value among predetermined theoretical values provided for the pixel-associated wavelengths.

5. An apparatus according to claim 4, wherein said theoretical values are derived from calculation by the following equation for a wavelength range of from 400 nm to 800 nm:

$$R(\lambda,h) = \frac{r(\lambda) + s(\lambda) - 2(r(\lambda)s(\lambda))^{1/2}\cos\delta}{1 + r(\lambda)s(\lambda) - 2(r(\lambda)s(\lambda))^{1/2}\cos\delta}$$

where $\delta = 4\pi h/\lambda$; $\lambda$, wavelength; h, the flying height of the head; $R(\lambda,h)$, the reflectance at wavelength $\lambda$ for the flying height h; $r(\lambda)$, the reflectance at wavelength $\lambda$ from a glass disk as seen from an air layer; $s(\lambda)$, the reflectance at wavelength $\lambda$ from the thin-film head as seen from the air layer.

6. An apparatus according to claim 5, wherein said theoretical values are data on 80–180 samples taken at intervals of about 2 nm–4 nm from the wavelength range of 400 nm to 800 nm and wherein the values of detection by said detecting pixels are extracted as data associated with the wavelength of the data in said wavelength range and subjected to data matching to determine the specific amount of flying height.

7. An apparatus according to claim 6, wherein said spectrometer is a concave diffraction grating, said photoelectric transducer being a CCD optical sensor and wherein said predetermined theoretical values are data that are tabulated in association with the wavelength.

* * * * *